US012619237B2

(12) United States Patent (10) Patent No.: US 12,619,237 B2
Christensen et al. (45) Date of Patent: *May 5, 2026

(54) TECHNOLOGY FOR MANAGING AUTONOMOUS VEHICLE OPERATION IN EMERGENCY SITUATIONS

(71) Applicant: STATE FARM MUTUAL AUTOMOBILE INSURANCE COMPANY, Bloomington, IL (US)

(72) Inventors: Scott T. Christensen, Salem, OR (US); Gregory L. Hayward, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/617,241

(22) Filed: Mar. 26, 2024

(65) Prior Publication Data

US 2024/0231360 A1 Jul. 11, 2024

Related U.S. Application Data

(63) Continuation of application No. 17/402,895, filed on Aug. 16, 2021, now Pat. No. 11,960,287, which is a
(Continued)

(51) Int. Cl.
*G05D 1/00* (2024.01)
*G05D 1/223* (2024.01)
(Continued)

(52) U.S. Cl.
CPC ......... *G05D 1/0214* (2013.01); *G05D 1/0011* (2013.01); *G05D 1/0276* (2013.01);
(Continued)

(58) Field of Classification Search
CPC .. G05D 1/0214; G05D 1/0011; G05D 1/0276; G05D 1/223; G05D 1/247;
(Continued)

(56) References Cited

U.S. PATENT DOCUMENTS 9,311,271 B2 4/2016 Wright
9,599,986 B1 3/2017 Eberbach et al.
(Continued)

FOREIGN PATENT DOCUMENTS

EP 3239686 A1 11/2017
EP 3578433 B1 8/2020
(Continued)

*Primary Examiner* — Yuen Wong
(74) *Attorney, Agent, or Firm* — MARSHALL, GERSTEIN & BORUN LLP

(57) ABSTRACT

Systems and methods for modifying operation of an autonomous vehicle in an emergency situation are disclosed. According to aspects, a computing device associated with the autonomous vehicle detects, based on sensor(s), an emergency event associated with the autonomous vehicle. In response to detecting the emergency event, the computing device determines location(s) of emergency vehicle(s) and determines an assistance location for the autonomous vehicle. The computing device determines which of the emergency vehicle(s) is a nearest emergency vehicle that is nearest to the assistance location, and transmits the assistance location to the nearest emergency vehicle. The computing device then causes the autonomous vehicle to travel to the assistance location.

20 Claims, 4 Drawing Sheets

Related U.S. Application Data continuation of application No. 15/906,333, filed on Feb. 27, 2018, now Pat. No. 11,119,490.

(51) Int. Cl.
  *G05D 1/247*          (2024.01)
  *G05D 1/617*          (2024.01)
(52) U.S. Cl.
  CPC ............. *G05D 1/223* (2024.01); *G05D 1/247* (2024.01); *G05D 1/617* (2024.01)
(58) Field of Classification Search
  CPC .... G05D 1/617; G08G 1/0112; G08G 1/0116; G08G 1/012; G08G 1/0133; G08G 1/0145; G08G 1/096811; G08G 1/205
  See application file for complete search history.

(56)                References Cited

U.S. PATENT DOCUMENTS

| | | | |
|---|---|---|---|
| 9,633,487 | B2 | 4/2017 | Wright |
| 9,830,748 | B2 | 11/2017 | Rosenbaum |
| 9,905,133 | B1 * | 2/2018 | Kumar ................... G07C 5/008 |
| 9,990,782 | B2 | 6/2018 | Rosenbaum |
| 10,192,369 | B2 | 1/2019 | Wright |
| 10,198,879 | B2 | 2/2019 | Wright |
| 10,269,190 | B2 | 4/2019 | Rosenbaum |
| 10,467,824 | B2 | 11/2019 | Rosenbaum |
| 11,227,452 | B2 | 1/2022 | Rosenbaum |
| 11,407,410 | B2 | 8/2022 | Rosenbaum |
| 11,524,707 | B2 | 12/2022 | Rosenbaum |
| 11,594,083 | B1 | 2/2023 | Rosenbaum |
| 2015/0185034 | A1 * | 7/2015 | Abhyanker .......... G05D 1/0088 701/23 |
| 2016/0071418 | A1 * | 3/2016 | Oshida ................ B60W 30/165 701/23 |
| 2018/0203451 | A1 | 7/2018 | Cronin et al. |
| 2022/0092893 | A1 | 3/2022 | Rosenbaum |
| 2022/0340148 | A1 | 10/2022 | Rosenbaum |
| 2023/0060300 | A1 | 3/2023 | Rosenbaum |

FOREIGN PATENT DOCUMENTS

| | | | |
|---|---|---|---|
| EP | 3730375 | B1 | 10/2021 |
| EP | 3960576 | A1 | 3/2022 |
| EP | 4190659 | A1 | 6/2023 |
| EP | 4190660 | A1 | 6/2023 |

* cited by examiner

TECHNOLOGY FOR MANAGING AUTONOMOUS VEHICLE OPERATION IN EMERGENCY SITUATIONS

CROSS-REFERENCE TO RELATED APPLICATION

This application is a continuation of U.S. patent application Ser. No. 17/402,895, entitled TECHNOLOGY FOR MANAGING AUTONOMOUS VEHICLE OPERATION IN EMERGENCY SITUATIONS, filed Aug. 16, 2021, which is a continuation of U.S. patent application Ser. No. 15/906,333, entitled TECHNOLOGY FOR MANAGING AUTONOMOUS VEHICLE OPERATION IN EMER-GENCY SITUATIONS, filed Feb. 27, 2018, the entire disclosure of which are hereby expressly incorporated herein by reference.

FIELD

The present disclosure is directed to technologies associated with autonomous vehicle operation. In particular, the present disclosure is directed to systems and methods for modifying or managing operation of autonomous vehicles in association with emergency events or situations.

BACKGROUND

Technologies associated with operation of autonomous vehicles are improving and becoming more ubiquitous. As a result, use of autonomous vehicles on roadways is expected to increase, with autonomous vehicles expected to at least partially replace conventional (i.e., non-autonomous) vehicles. Similar to conventional vehicles, autonomous vehicles may be of different types and for different uses. For example, some autonomous vehicles may serve to transport individuals to a destination, while other autonomous vehicles may be designated for emergency use (e.g., a fire engine or ambulance).

In the event of an emergency situation, such as a dispatch of a fire engine, a hurricane, or a tornado, conventional vehicles may be operated differently than they are in normal situations.

For example, conventional vehicles may pull over to the side of the road to allow a fire engine unobstructed access to the road. As another example, a police car may operate at an increased speed in order to more quickly reach a destination. However, there is no way to inform autonomous vehicles, whether emergency or non-emergency, of emergency situations, and thus autonomous vehicles do not operate at optimal efficiency in emergency situations.

Accordingly, there is an opportunity for techniques to detect emergency situations and accordingly facilitate effective operation of autonomous vehicles.

SUMMARY

In an embodiment, a computer-implemented method of modifying operation of an autonomous vehicle in an emergency situation is provided. The method may include: detecting, based on one or more sensors associated with the autonomous vehicle, an emergency event associated with the autonomous vehicle, and in response to detecting the emergency event: (a) determining one or more locations of one or more emergency vehicles, (b) determining an assistance location for the autonomous vehicle, the assistance location being a future location of the autonomous vehicle to receive assistance from the one or more emergency vehicles, (c) transmitting the assistance location to the one or more emergency vehicles, (d) obtaining a current operation of the autonomous vehicle, (e) determining, based on the current operation of the autonomous vehicle and the assistance location, a vehicle operation modification for the autonomous vehicle, (f) generating, by a computer processor based on the vehicle operation modification, a set of vehicle control instructions for the autonomous vehicle, and (g) providing the set of vehicle control instructions to the autonomous vehicle, wherein the autonomous vehicle executes the set of vehicle control instructions to cause the autonomous vehicle to travel to the assistance location.

In another embodiment, a system for modifying operation of an autonomous vehicle in an emergency situation is provided. The system may include: a transceiver configured to communicate with the autonomous vehicle via at least one network connection; a memory storing a set of computer-executable instructions; and a processor interfacing with the transceiver and the memory, and configured to execute the computer-executable instructions to cause the processor to: detect, based on one or more sensors associated with the autonomous vehicle, an emergency event associated with the autonomous vehicle; and in response to detecting the emergency event: (a) determine one or more locations of one or more emergency vehicles, (b) determine an assistance location for the autonomous vehicle, the assistance location being a future location of the autonomous vehicle to receive assistance from the one or more emergency vehicles, (c) transmit the assistance location to the one or more emergency vehicles, (d) obtain a current operation of the autonomous vehicle, (e) determine, based on the current operation of the autonomous vehicle and the assistance location, a vehicle operation modification for the autonomous vehicle, (f) generate, by a computer processor based on the vehicle operation modification, a set of vehicle control instructions for the autonomous vehicle, and (g) provide the set of vehicle control instructions to the autonomous vehicle, wherein the autonomous vehicle executes the set of vehicle control instructions to cause the autonomous vehicle to travel to the assistance location.

In a further embodiment, a computer-implemented method in an autonomous vehicle of modifying operation of the autonomous vehicle in an emergency situation is provided. The method may include: detecting, based on one or more sensors associated with the autonomous vehicle, an emergency event associated with the autonomous vehicle; and in response to detecting the emergency event: (a) determining one or more locations of one or more emergency vehicles, (b) determining an assistance location for the autonomous vehicle, the assistance location being a future location of the autonomous vehicle to receive assistance from the one or more emergency vehicles, (c) transmitting the assistance location to the one or more emergency vehicles, (d) obtaining a current operation of the autonomous vehicle, (e) determining, based on the current operation of the autonomous vehicle and the assistance location, a vehicle operation modification for the autonomous vehicle, (f) generating, by a computer processor based on the vehicle operation modification, a set of vehicle control instructions for the autonomous vehicle, and (g) executing the set of vehicle control instructions to cause the autonomous vehicle to travel to the assistance location.

DETAILED DESCRIPTION

Figure 1:
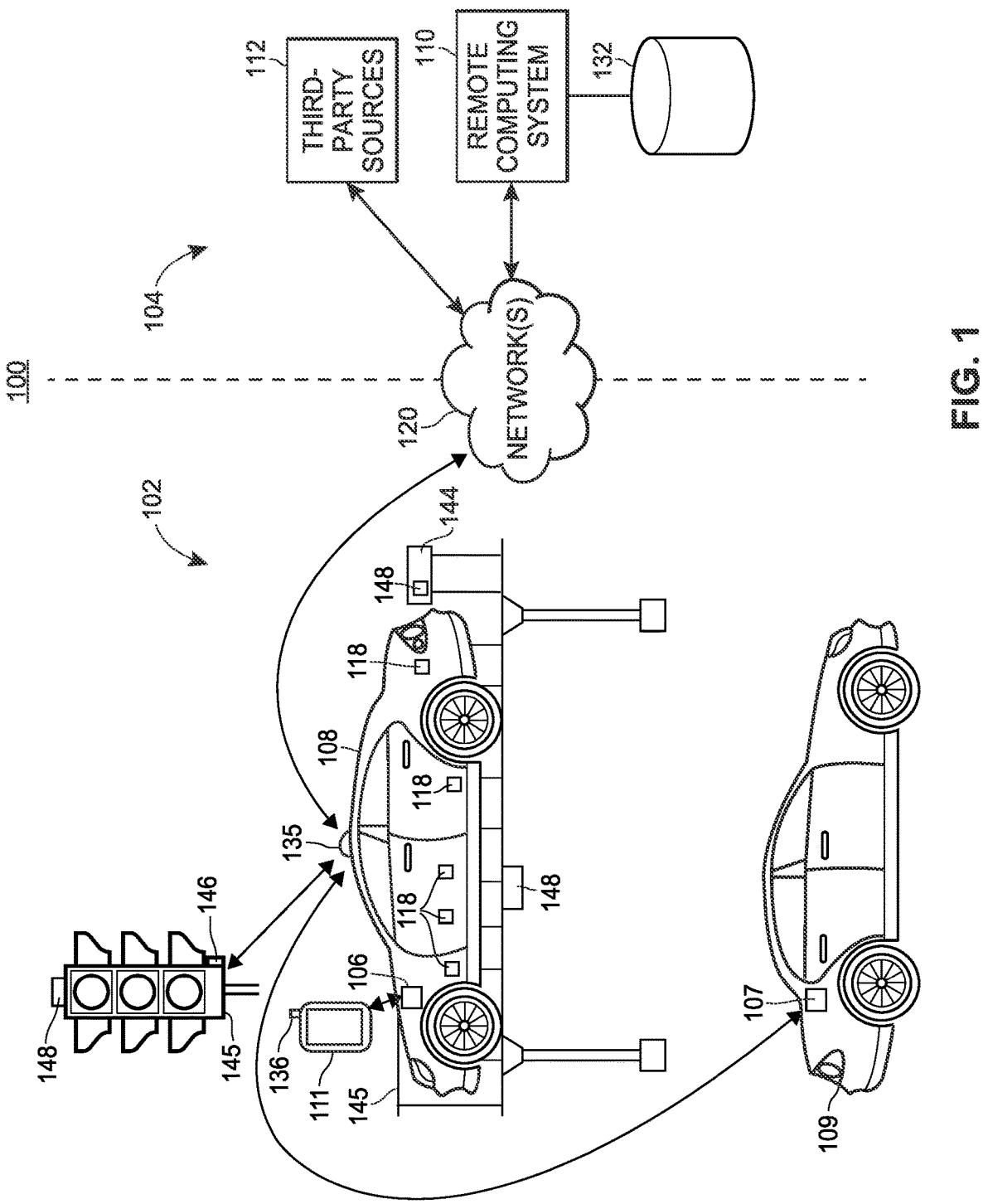
FIG. 1 depicts an overview of components and entities associated with the systems and methods, in accordance with some embodiments.

The present embodiments may relate to, inter alia, modification of autonomous vehicle operation in association with emergency events. According to certain aspects, systems and methods are configured to detect an emergency situation and assess an operation(s) of an autonomous vehicle(s) and an emergency vehicle(s) that may be associated with the emergency situation. The systems and methods may determine how operation of the autonomous vehicle(s) and optionally the emergency vehicle(s) should be modified, generate control instructions for the autonomous vehicle(s) and/or the emergency vehicle(s), and cause the autonomous vehicle(s) and/or the emergency vehicle(s) to implement the control instructions to cause the autonomous vehicle(s) and/or the emergency vehicle(s) to accordingly modify operation. Generally, the goal of the systems and methods may be to modify operation of a non-emergency autonomous vehicle(s) so that the emergency vehicle(s) may more effectively respond to or address the emergency situation.

The systems and methods therefore offer numerous benefits. In particular, the systems and methods can promptly detect emergency situations associated with autonomous vehicles and transmit the emergency event and/or operation data of the autonomous vehicle to emergency vehicles. The operation of the autonomous vehicles may be modified with a goal to cause the autonomous vehicle to travel to an assistance location. The assistance location may be a future location for the autonomous vehicle to receive assistance from the emergency vehicles. As a result, occupants of the autonomous vehicles may receive assistance for a variety of emergency events, e.g., medical emergencies, criminal activities, etc. It should be appreciated that additional benefits are envisioned.

The systems and methods discussed herein address a challenge that is particular to autonomous vehicle operation. In particular, the challenge relates to a difficulty in effectively and efficiently controlling operation of autonomous vehicles in emergency situations. Conventionally, autonomous vehicles operate according to a set of established rules, inputs, and goals associated with their current surroundings, without taking into account emergency situations where operation modification is beneficial.

The systems and methods offer improved capabilities to solve these problems by detecting the occurrence of an emergency event, assessing a configuration or operation of an autonomous vehicle that may be associated with the emergency event, determining an assistance location for the autonomous vehicle, and causing the autonomous vehicle to modify operation so that the autonomous vehicle, or occupants thereof, may receive assistance regarding the emergency event. Further, because the systems and methods employ the capture, analysis, and transmission of data between and among multiple devices, the systems and methods are necessarily rooted in computer technology in order to overcome the noted shortcomings that specifically arise in the realm of autonomous vehicle operation.

FIG. 1 illustrates an overview of a system 100 of components configured to facilitate the systems and methods. Generally, the system 100 may include both hardware components and software applications that may execute on the hardware components, as well as various data communications channels for communicating data between and among the various components. It should be appreciated that the system 100 is merely an example and that alternative or additional components are envisioned.

As illustrated in FIG. 1, the system 100 may be segmented into a set of front-end components 102 and a set of back-end components 104. The front-end components 102 may include a vehicle 108 which may be, for example, an automobile, car, truck, tow truck, snowplow, boat, motorcycle, motorbike, scooter, recreational vehicle, or any other type of vehicle capable of roadway or water travel. According to embodiments, the vehicle 108 may be an autonomous vehicle capable of at least partial (or total) autonomous operation by a computer 106 via the collection and analysis of various sensor data. Further, the vehicle 108 may be an emergency vehicle (e.g., a fire engine or an ambulance), or may be a non-emergency vehicle (e.g., a passenger car). The system 100 may further include at least one additional vehicle 109 capable of at least partial (or total) autonomous operation by a computer 107 via the collection and analysis of various sensor data, where the additional vehicle(s) 109 may be an emergency vehicle(s) or a non-emergency vehicle (s). Although FIG. 1 depicts the two vehicles 108, 109, it should be appreciated that additional vehicles are envisioned.

The computer 106 may be permanently or removably installed in the vehicle 108, and may generally be an on-board computing device capable of performing various functionalities relating to autonomous vehicle automatic operation. Thus, the computer 106 may be particularly configured with particular elements to thereby be able to perform functions relating to autonomous vehicle automatic operations. Further, the computer 106 may be installed by the manufacturer of the vehicle 108, or as an aftermarket modification or addition to the vehicle 108. In FIG. 1, although only one computer 106 is depicted, it should be understood that in some embodiments, a plurality of computers 106 (which may be installed at one or more locations within the vehicle 108) may be used.

The system 100 may further include an electronic device 111 that may be associated with the vehicle 108, where the electronic device 111 may be any type of electronic device such as a mobile device (e.g., a smartphone), notebook computer, tablet, phablet, GPS (Global Positioning System) or GPS-enabled device, smart watch, smart glasses, smart bracelet, wearable electronic, PDA (personal digital assistants), pager, computing device configured for wireless communication, and/or the like. The electronic device 111 may be equipped or configured with a set of sensors, such as a location module (e.g., a GPS chip), an image sensor, an accelerometer, a clock, a gyroscope, a compass, a yaw rate sensor, a tilt sensor, and/or other sensors.

The electronic device 111 may belong to or be otherwise associated with an individual, where the individual may be an owner of the vehicle 108 or otherwise associated with the vehicle 108. For example, the individual may rent the vehicle 108 for a variable or allotted time period, or the individual may at least partially operate (or be a passenger of) the vehicle 108 as part of a ride share. Generally, the individual may at least partially operate the vehicle 108 (and may thus be an operator of the vehicle), or may be a passenger of the vehicle 108 (e.g., if the vehicle 108 is operating autonomously). According to embodiments, the individual may carry or otherwise have possession of the electronic device 111 during operation of the vehicle 108, regardless of whether the individual is the operator or passenger of the vehicle 108.

In some embodiments, the computer 106 may operate in conjunction with the electronic device 111 to perform any or all of the functions described herein as being performed by the vehicle 108. In other embodiments, the computer 106 may perform all of the on-board vehicle functions described herein, in which case the electronic device 111 may not be present or may not be connected to the computer 106. In still other embodiments, the electronic device 111 may perform all of the onboard autonomous vehicle functions described herein. Still further, in some embodiments, the computer 106 and/or the electronic device 111 may perform any or all of the functions described herein in conjunction with one or more of the back-end components 104. For example, in some embodiments or under certain conditions, the electronic device 111 and/or the computer 106 may function as thin-client devices that outsource some or most of the processing to one or more of the back-end components 104.

The computer 106 and/or the electronic device 111 may communicatively interface with one or more on-board sensors 118 that are disposed on or within the vehicle 108 and that may be utilized to monitor the vehicle 108 and the environment in which the vehicle 108 is operating. In particular, the one or more on-board sensors 118 may sense conditions associated with the vehicle 108 and/or associated with the environment in which the vehicle 108 is operating, and may generate sensor data indicative of the sensed conditions. For example, the sensor data may include a location and/or operation data indicative of operation of the vehicle 108. In some configurations, at least some of the on-board sensors 118 may be fixedly disposed at various locations on the vehicle 108. Additionally or alternatively, at least some of the on-board sensors 118 may be incorporated within or connected to the computer 106. Still additionally or alternatively, in some configurations, at least some of the on-board sensors 118 may be included on or within the electronic device 111.

The on-board sensors 118 may communicate respective sensor data to the computer 106 and/or to the electronic device 111, and the sensor data may be processed using the computer 106 and/or the electronic device 111 to determine when the vehicle 108 is in operation as well as determine information regarding operation of the vehicle 108. In some situations, the on-board sensors 118 may communicate respective sensor data indicative of the environment in which the vehicle 108 is operating.

According to embodiments, the sensors 118 may include one or more of a GPS unit, a radar unit, a LIDAR unit, an ultrasonic sensor, an infrared sensor, some other type of electromagnetic energy sensor, a microphone (e.g., to support detect/listen for audio/sound wave of siren(s) associated with an emergency vehicle), a radio (e.g., to support wireless emergency alerts or an emergency alert system), an inductance sensor, a camera, an accelerometer, an odometer, a system clock, a gyroscope, a compass, a geo-location or geo-positioning unit, a location tracking sensor, a proximity sensor, a tachometer, a speedometer, and/or the like. Some of the on-board sensors 118 (e.g., GPS, accelerometer, or tachometer units) may provide sensor data indicative of, for example, the vehicle's 108 location, speed, position acceleration, direction, responsiveness to controls, movement, etc.

Other sensors 118 may be directed to the interior or passenger compartment of the vehicle 108, such as cameras, microphones, pressure sensors, weight sensors, thermometers, or similar sensors to monitor any passengers, operations of instruments included in the vehicle 108, operational behaviors of the vehicle 108, and/or conditions within the vehicle 108. For example, on-board sensors 118 directed to the interior of the vehicle 108 may provide sensor data indicative of, for example, in-cabin temperatures, in-cabin noise levels, data from seat sensors (e.g., indicative of whether or not an individual is using a seat, and thus the number of passengers being transported by the vehicle 108), data from seat belt sensors, data regarding the operations of user controlled devices such as windshield wipers, defrosters, traction control, mirror adjustment, interactions with on-board user interfaces, etc. Additionally, the on-board sensors 118 may further detect and monitor the health of the occupant(s) of the vehicle 108 (e.g., blood pressure, heart rate, blood sugar, temperature, etc.). Such health-based sensors may be used, for example, in some embodiments, to sense that an occupant of the vehicle 109 is having a medical emergency (e.g., a heart attack, stroke, seizure, going into labor, etc.). In still further embodiments, the vehicle may include a button, switch, toggle, trigger, or other indicator that serves as an emergency trigger (e.g., "panic" button) to electronically communicate, or otherwise indicate, to the vehicle's computer 106 that the occupant is having an emergency. The electronic communication may be made to a hospital or emergency vehicle, e.g., such as a nearby emergency vehicle and/or an emergency specifically equipped to handle the medical emergency. Moreover, the on-board sensors 118 may additionally detect various criminal acts, including auto thefts, carjackings, and/or the like. For example, the on-board sensors 118 may send electronic signals to the vehicle's computer 106 that a door of the vehicle 108 has been opened in an improper manner (e.g., such as without a key or without the vehicle's electronic key fob in a required vicinity of the vehicle). In another example, the on-board sensors 118 and/or vehicle computer 106 may detect that the vehicle is being driven at excessive speed, which may cause the computer 106 to log that the vehicle may be involved in a high-speed chase. Such events may cause the computer 106 to register a criminal event is taking place. In some embodiments, the vehicle 108 may initiate communications to relevant responders (e.g., a hospital, a police station, or emergency vehicles) of the detected act(s). In further embodiments, the registering of the criminal event may cause the vehicle 108 to pull over on the side of the road (e.g., to safely stop on the shoulder) until responders/police arrive. In such embodiments, the vehicle 108 would broadcast its location, e.g., via GPS as described herein. In still further embodiments, the registering of the criminal event may cause the autonomous vehicle 108 to drive to nearest law enforcement facility (e.g., police station).

Some of the sensors 118 disposed at the vehicle 108 (e.g., radar, LIDAR, camera, or other types of units that operate by using electromagnetic energy) may actively or passively scan the environment external to the vehicle 108 for obstacles (e.g., emergency vehicles, other vehicles, buildings, pedestrians, trees, gates, barriers, animals, etc.) and their movement, weather conditions (e.g., precipitation, wind, visibility, or temperature), roadways, road conditions (e.g., lane markings, potholes, road material, traction, or slope), road topography, traffic conditions (e.g., traffic density, traffic congestion, etc.), signs or signals (e.g., traffic signals, speed limits, other jurisdictional signage, construction signs, building signs or numbers, or control gates), and/or other information indicative of the environment of the vehicle 108. Information or data that is generated or received by the on-board sensors 118 may be communicated to the computer 106 and/or to the electronic device 111.

In some embodiments of the system 100, the front-end components 102 may communicate collected sensor data to the back-end components 104 (e.g., via a network(s) 120). In particular, at least one of the computer 106 and the electronic device 111 may communicate with the back-end components 104 via the network(s) 120 to enable the back-end components 104 to record collected sensor data and information regarding autonomous vehicle usage.

The network(s) 120 may include a proprietary network, a secure public internet, a virtual private network, and/or some other type of network, such as dedicated access lines, plain ordinary telephone lines, satellite links, cellular data networks, combinations of these and/or other types of networks. The network(s) 120 may utilize one or more radio frequency communication links to communicatively connect to the vehicle 108, e.g., utilize wireless communication link(s) to communicatively connect with the electronic device 111 and the computer 106. Where the network(s) 120 comprises the Internet or other data packet network, data communications may take place over the network(s) 120 via an Internet or other suitable data packet communication protocol. In some arrangements, the network(s) 120 additionally or alternatively includes one or more wired communication links or networks.

The back-end components 104 include one or more servers or computing devices, which may be implemented as a server bank or cloud computing system 110, and is interchangeably referred to herein as a "remote computing system 110." The remote computing system 110 may include one or more computer processors adapted and configured to execute various software applications and components of the system 100, in addition to other software applications.

The remote computing system 110 may further include or be communicatively connected to one or more data storage devices or entities 132, which may be adapted to store data related to the operation of the vehicle 108, the environment and context in which the vehicle 108 is operating, and/or other information. For example, the one or more data storage devices 132 may be implemented as a data bank or a cloud data storage system, at least a portion of which may be locally accessed by the remote computing system 110 using a local access mechanism such as a function call or database access mechanism, and/or at least a portion of which may be remotely accessed by the remote computing system 110 using a remote access mechanism such as a communication protocol. The remote computing system 110 may access data stored in the one or more data storage devices 132 when executing various functions and tasks associated with the present disclosure.

The back-end components 104 may further include a set of third-party sources 112, which may be any system, entity, repository, or the like, capable of obtaining and storing data that may be indicative of situations and circumstances associated with vehicle operation. Although FIG. 1 depicts the set of third-party source(s) 112 as separate from the one or more data storage devices 132, it should be appreciated that the set of third-party sources 112 may be included as part of the one or more data storage devices 132. In embodiments, the third-party source(s) 112 may detect, based on certain obtained data, when certain emergency events occur. For example, the third-party source 112 may be associated with a fire station that generates an alert when a fire engine has been deployed. Further, in embodiments, the third-party source(s) 112 may store data indicative of vehicle operation regulations. For example, the third-party source 112 may store speed limit information, direction of travel information, lane information, map information, route information, and/or similar information. The third-party source(s) 112 may also maintain or obtain real-time data indicative of traffic signals for roadways (e.g., which traffic signals currently have red lights or green lights). It should be appreciated that the one or more data storage devices or entities 132 may additionally or alternatively store the data indicative of vehicle operation regulations.

To communicate with the remote computing system 110 and other portions of the back-end components 104, the front-end components 102 may include a communication component(s) 135, 136 that are configured to transmit information to and receive information from the back-end components 104 and, in some embodiments, transmit information to and receive information from other external sources, such as emergency vehicles, other vehicles and/or infrastructure or environmental components disposed within the environment of the vehicle 108. The communication components 135, 136 may include one or more wireless transmitters or transceivers operating at any desired or suitable frequency or frequencies.

Different wireless transmitters or transceivers may operate at different frequencies and/or by using different protocols, if desired. In an example, the electronic device 111 may include a respective communication component 136 for sending or receiving information to and from the remote computing system 110 via the network(s) 120, such as over one or more radio frequency links or wireless communication channels which support a first communication protocol (e.g., GSM, CDMA, LTE, one or more IEEE 802.11 Standards such as Wi-Fi, WiMAX, BLUETOOTH, etc.). Additionally or alternatively, the computer 106 may operate in conjunction with an on-board transceiver or transmitter 135 that is disposed at the vehicle 108 (which may for example, be fixedly attached to the vehicle 108) for sending or receiving information to and from the remote computing system 110 via the network(s) 120, such as over one or more radio frequency links or wireless communication channels which support the first communication protocol and/or a second communication protocol.

In some embodiments, the computer 106 may operate in conjunction with the electronic device 111 to utilize the communication component 136 of the electronic device 111 to deliver information to the back-end components 104. In some embodiments, the computer 106 may operate in conjunction with the electronic device 111 to utilize the communication component 135 of the vehicle 108 to deliver information to the back-end components 104. In some embodiments, the communication components 135, 136 and their respective links may be utilized by the computer 106 and/or the electronic device 111 to communicate with the back-end components 104.

Accordingly, either one or both of the electronic device 111 or the computer 106 may communicate with the network(s) 120 over the link(s). Additionally, in some configurations, the electronic device 111 and the computer 106 may communicate with one another directly over a wireless or wired link.

In some embodiments of the system 100, the computer 106 and/or the electronic device 111 of the vehicle 108 may communicate with respective on-board computers and/or electronic devices disposed at the additional vehicle(s) 109 (e.g., emergency vehicles, other autonomous vehicles, or other vehicles), either directly or via the network(s) 120. For example, the computer 106 and/or the electronic device 111 disposed at the vehicle 108 may communicate with respective on-board computers and/or mobile devices of the additional vehicle(s) 109 via the network(s) 120 and the communication component(s) 135, 136 by using one or more suitable wireless communication protocols (e.g., GSM, CDMA, LTE, one or more IEEE 802.11 Standards such as Wi-Fi, WiMAX, BLUETOOTH, etc.). In some configurations, the computer 106 may directly communicate with the additional vehicle(s) 109 in a peer-to-peer (P2P) manner, which may utilize, for example, a Wi-Fi direct protocol, a BLUETOOTH or other short range communication protocol, an ad-hoc cellular communication protocol, or any other suitable wireless communication protocol.

In some embodiments, the system 100 may include one or more environmental communication components or devices, examples of which are depicted in FIG. 1 by references 144 and 146, that may be used for monitoring the status of one or more infrastructure components 145 and/or for receiving data generated by other sensors 148 that may be associated with, or may detect or be detected by, the vehicle 108 and disposed at locations that are off-board the vehicle 108. As generally referred to herein, with respect to the vehicle 108, "off-board sensors" or "environmental sensors" 148 are sensors that are not transported by the vehicle 108. The data collected by the off-board sensors 148 is generally referred to herein as "sensor data," "off-board sensor data," or "environmental sensor data" with respect to the vehicle 108.

At least some of the off-board sensors 148 may be disposed on or at the one or more infrastructure components 145 or other types of components that are fixedly disposed within the environment in which the vehicle 108 is traveling. Infrastructure components 145 may include roadways, bridges, traffic signals, gates, switches, crossings, parking lots or garages, tollbooths, docks, hangars, or other similar physical portions of a transportation system's infrastructure, for example. Other types of infrastructure components 145 at which off-board sensors 148 may be disposed may include a traffic light, a street sign, a railroad crossing signal, a construction notification sign, a roadside display configured to display messages, a billboard display, a parking garage monitoring device, etc. Off-board sensors 148 that are disposed on or near infrastructure components 145 may generate data relating to the presence and location of obstacles or of the infrastructure component 145 itself, weather conditions, traffic conditions, operating status of the infrastructure component 145, and/or behaviors of various vehicles 108, 109, pedestrians, and/or other moving objects within the vicinity of the infrastructure component 145, for example.

Additionally or alternatively, at least some of the off-board sensors 148 that are communicatively connected to the one or more infrastructure devices 145 may be disposed on or at one or more other vehicle(s) 109 operating in the vicinity of the vehicle 108. As such, a particular sensor that is disposed on-board the additional vehicle 109 may be viewed as an off-board sensor 148 with respect to the vehicle 108.

The one or more environmental communication devices 144, 146 may be communicatively connected (either directly or indirectly) to the one or more off-board sensors 148, and thereby may receive information relating to the condition and/or location of the infrastructure components 145, of the environment surrounding the infrastructure components 145, and/or of the other vehicle(s) 109 or objects within the environment of the vehicle 108. In some embodiments, the one or more environmental communication devices 144, 146 may receive information from the vehicle 108, while, in other embodiments, the environmental communication device(s) 144, 146 may transmit information to the vehicle 108.

As previously discussed, at least some of the environmental communication devices 144, 146 may be locally disposed in the environment in which the vehicle 108 is operating. In some embodiments, at least some of the environmental communication devices 144, 146 may be remotely disposed, e.g., at the back-end components 104 of the system 100. In some embodiments, at least a portion of the environmental communication devices 144, 146 may be included in (e.g., integral with) one or more off-board sensors 148. In some configurations, at least some of the environmental communication devices 144, 146 may be included or integrated into the one or more on-board communication components 135, 136, the computer 106, the electronic device 111, and/or the additional vehicle(s) 109, or components thereof.

In addition to receiving information from the on-board sensors 118 and off-board sensors 148 associated with the vehicle 108, the computer 106 may directly or indirectly control the operation of the vehicle 108 according to various fully- or semi-autonomous operation features. The autonomous operation features may include software applications or modules implemented by the computer 106 to generate and implement control commands to control the steering, braking, or motive power of the vehicle 108. To facilitate such control, the computer 106 may be communicatively connected to control components of the vehicle 108 by various electrical or electromechanical control components (not shown).

When a control command is generated by the computer 106, it may thus be communicated to the control components of the vehicle 108 to effect a control action. In embodiments involving fully autonomous vehicles, the vehicle 108 may be operable only through such control components (not shown). In other embodiments, the control components may be disposed within or supplement other vehicle operator control components (not shown), such as steering wheels, accelerator, or brake pedals, or ignition switches.

Further, the computer 106 may control one or more operations of the vehicle 108 when the vehicle is operating non-autonomously. For example, the computer 106 may automatically detect respective triggering conditions and automatically activate corresponding features such as traction control, windshield wipers, headlights, braking, etc.

In embodiments, the remote computing system 110 may alternatively or additionally control the operation of the vehicle 108 according to various fully-autonomous or semi-autonomous operation features. In particular, the remote computing system 110 may include software applications or modules to generate and implement control commands to control the steering, braking, or motive power of the vehicle 108. In operation, the remote computing system 110 may generate control command(s) and communicate the control command(s) to the computer 106 via the network(s) 120 and the communication component 135, which may communicate the command(s) to the control components of the vehicle 108 to effect a control action.

Figure 2:
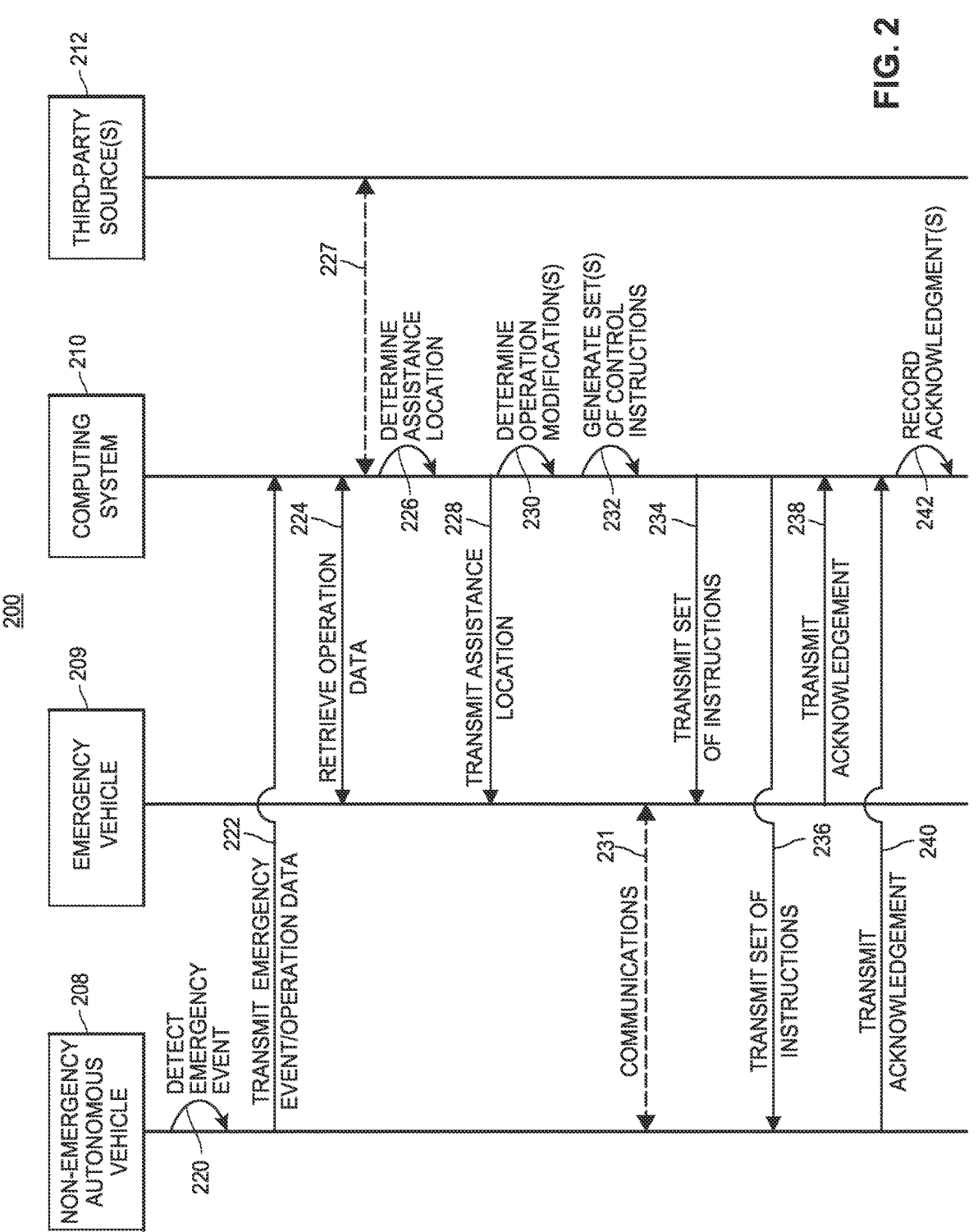
FIG. 2 depicts an example signal diagram associated with facilitating operation of an autonomous vehicle(s), in accordance with some embodiments.

FIG. 2 depicts a signal diagram 200 associated with facilitating autonomous vehicle operation in association with an emergency situation. The signal diagram 200 includes a non-emergency autonomous vehicle 208 (such as the vehicle 108 as discussed with respect to FIG. 1), an emergency vehicle 209, a computing system 210 (such as the remote computing system 110 or the computer 106 as discussed with respect to FIG. 1), and a set of third-party source(s) 212 (such as the set of third-party source(s) 112 as discussed with respect to FIG. 1). The set of third-party source(s) 212 may be included as part of the computing system 210, or may communicate with the computing system 210 via one or more networks. It should be appreciated that the emergency vehicle 209 may be non-autonomous, semi-autonomous, or fully-autonomous.

In one implementation, the computing system 210 may be remote (i.e., back-end) from the vehicles 208, 209, in which case the computing system 210 may communicate with the vehicles 208, 209 via one or more networks. In another implementation, the computing system 210 may be included as part of (i.e., on board) either or both of the vehicles 208, 209, in which case the computing system 210 may include a computer and a set of components configured to control respective operation of the vehicles 208, 209. In an alternative or additional implementation, the vehicles 208, 209 may connect to and communicate with each other, such as via one or more networks.

The signal diagram 200 may begin when one or more sensors associated with an autonomous vehicle (e.g., on-board sensors 118 or off-board sensors 148) detect (220) an emergency event associated with the autonomous vehicle. According to embodiments, the emergency event may be indicative of an event or situation for which emergency services (e.g., fire prevention or containment, medical services, police attention) may be needed. For example, an occupant of the autonomous vehicle may be experiencing a medical emergency, such as a heart attack. In another example, the emergency event may be a criminal activity, such as when the one or more sensors detects improper access or tampering with the ignition system, doors or other openings of the autonomous vehicle, security mechanism of the autonomous vehicle, or other starting/security mechanism of the autonomous vehicle.

Detection of the emergency event may cause the autonomous vehicle (e.g., via computer 106) to transmit (222) a description of the emergency event and/or the current operation data of the autonomous vehicle to the computing system 210. The current operation data of the autonomous vehicle may be retrieved from the autonomous vehicle 208 (or from a component thereof). According to embodiments, the operation data may include location data in the form of GPS coordinates that may indicate a roadway on which the autonomous vehicle 208 is traveling or has traveled. Further, the operation data may indicate one or more of: a speed, a direction of travel, additional telematics data (e.g., turning data, acceleration data, braking data, etc.), an origin location, a destination location, a current route, and/or the like.

The computing system 210 may also retrieve (224) operation data from the emergency vehicle 209 (or from a component thereof). According to embodiments, the operation data may include location data in the form of GPS coordinates that may indicate a roadway on which the emergency vehicle 209 is traveling or has traveled. Further, the operation data may indicate one or more of: a speed, a direction of travel, additional telematics data (e.g., turning data, acceleration data, braking data, etc.), an origin location, a destination location, a current route, and/or the like. In some embodiments, retrieving the operation data from emergency vehicles (e.g., including emergency vehicle 209) may include determining a nearest emergency vehicle (e.g., emergency vehicle 209) that is nearest to the assistance location. In further embodiments, retrieving the operation data from emergency vehicles (e.g., including emergency vehicle 209) may include determining one or more specific emergency vehicles (e.g., emergency vehicle 209) at least partially equipped to handle the emergency event. For example, for a medical emergency (e.g., a heart attack) an ambulance may be at least partially equipped to handle such a medical emergency. In further examples, a fire engine may be at least partially equipped to handle an emergency event associated with a building fire, and a police car may be at least partially equipped to handle an emergency event associated with a criminal activity. In some situations, a fire engine may also be at least partially equipped to handle a heart attack related emergency event, for example, where occupants of the fire engine have special training to handle heart attack events or where the fire engine is equipped with special equipment to handle heart attack events (e.g., such as an automated external defibrillator (AED) device).

The computing system 210 may determine (226) an assistance location for the autonomous vehicle. The assistance location may be a future location of the autonomous vehicle at which the autonomous vehicle 208 may receive assistance from the emergency vehicle 209. The computing system 210 may determine the assistance location based on the operation data received from the autonomous vehicle 208 and/or the emergency vehicle 209, including for example, based on the location of the autonomous vehicle 208 and/or the location of the emergency vehicle 209 as determined from the respective operation data. The computing system may also request (227) additional data from third-party source(s) 212 in order to determine the assistance location. For example, the additional data retrieved from third-party source(s) 212 may include route information, map information, weather information, road condition information, or other such information used for determining the assistance location.

The assistance location may be determined based on the location of the autonomous vehicle 208 and/or the emergency vehicle 209. For example, in some embodiments the assistance location may be a location where a nearby emergency vehicle 209 can safely access the autonomous vehicle 208, such as in a roadside shoulder, parking lot, or low traffic area. In still further embodiments, the assistance location may be a location that facilitates a fast response time, such as a location or area in between, or in a simultaneous direction of travel for, the autonomous vehicle 208 and the emergency vehicle 209, such that both the autonomous vehicle 208 and the emergency vehicle 209 travel to the assistance location at the same time. In some embodiments, the assistance location is at or near services for handling the emergency event. For example, for a medical emergency event, the assistance location may be at or near a hospital or similar treatment center. In a further example, for a criminal activity related emergency event, the assistance location may be at or near a police station or other similar location.

The computing system 210 may transmit (228) the assistance location to the emergency vehicle 209. The assistance location may allow the emergency vehicle 209 to travel to the assistance location, as described herein, to provide assistance to the occupant of the autonomous vehicle 208 experiencing the emergency event.

The computing system 210 may determine (230), based on at least in part on the current operation of the autonomous vehicle 208 and the assistance location, a vehicle operation modification for the autonomous vehicle 208. In some embodiments, where the emergency vehicle 209 is autonomous (or semi-autonomous) a vehicle operation may also be determined for the emergency vehicle 209. In embodiments, the operation modification may represent one or more parameters that replace one or more existing operation parameters, for either or both of the vehicles 208, 209. For example, the operation modification may be any of: (1) set max speed to a maximum speed of the vehicle; (2) alter current route to the assistance location; (3) change operation speed; (4) engage or change emergency lights/signals associated with the vehicle; and/or (5) initiate direct communications with other vehicles (e.g., between vehicles 208 or 209) as described herein.

As illustrated in of FIG. 2, in some embodiments, the autonomous vehicle 208 may directly communicate (231) with the emergency vehicle 209, such as via one or more wireless networks. In particular, the autonomous vehicle 208 may retrieve information from the emergency vehicle 209, or vice versa, such as location data, operation data, planned route information, assistance location, operation modification information, and/or the like. Accordingly, a respective computer of either or both of the vehicles 208, 209 may perform the functionalities discussed herein. For example, in some embodiments, the vehicles 208 and 209 may communicate with each other via the computing system 210. For example, the emergency vehicle 209 may transmit an expected response time indicating an expected time of arrival of the emergency vehicle at the assistance location to the computing system 210. The computing system 210 may then provide the autonomous vehicle 208 with the expected time of arrival. In another embodiment, the computing system 210 may receive from the emergency vehicle 210, on a periodic basis, an updated location of the emergency vehicle 209. The computing system 210 may then provide the autonomous vehicle 208 the updated locations on the same or similar periodic basis. The aforementioned embodiments may be implemented either vehicle-to-vehicle (e.g., from autonomous vehicle 208 to emergency vehicle 209 and vice versa) or through a remote computing system (e.g., via remote computing system 110).

The computing system 210 may generate (232) a set(s) of instructions based on the operation modification(s) determined in (230), where the computing system 210 may generate a set of instructions for the autonomous vehicle 208 and/or a set of instructions for the emergency vehicle 209. In embodiments, the set(s) of instructions may be configured to be executed by a respective computer associated with the respective vehicle 208, 209 (which, in some cases, may be the computing system 210), to cause the respective vehicle 208, 209 to undertake or complete the operation modification. For example, the vehicle operation modification may cause the autonomous vehicle 208 and/or emergency vehicle 209 to travel to the assistance location.

In situations in which the computing system 210 is remote from the autonomous vehicle 208, the computing system 210 may transmit (236) the set of instructions to the autonomous vehicle 208 via a network connection. After receipt or generation of the set of instructions, a computing device of the autonomous vehicle 208 may execute the set of instructions to effectively cause the autonomous vehicle 208 to operate according to the appropriate operation modification determined in (230). In an embodiment, if an individual is present in the autonomous vehicle 208, the autonomous vehicle 208 may present (e.g., via a user interface) an indication of the operation modification, and may optionally enable the individual to approve initiation of the operation modification. Further, in an embodiment, the autonomous vehicle 208 may automatically execute the set of instructions in response to receiving the set of instructions or generating the set of instructions. After executing the set of instructions, the autonomous vehicle 208 may generate and transmit (240) an acknowledgement that the set of instructions were executed and that the operation modification was implemented.

In situations in which the computing system 210 is remote from the emergency vehicle 209, the computing system 210 may transmit (234) the set of instructions to the emergency vehicle 209 via a network connection. After receipt or generation of the set of instructions, a computing device of the emergency vehicle 209 may execute the set of instructions to effectively cause the emergency vehicle 209 to operate according to the appropriate operation modification determined in (230). In an embodiment, if an individual is present in the emergency vehicle 209, the emergency vehicle 209 may present (e.g., via a user interface) an indication of the operation modification, and may optionally enable the individual to approve initiation of the operation modification. Further, in an embodiment, the emergency vehicle 209 may automatically execute the set of instructions in response to receiving the set of instructions or generating the set of instructions. After executing the set of instructions, the emergency vehicle 209 may generate and transmit (238) an acknowledgement that the set of instructions were executed and that the operation modification was implemented.

The computing system 210 may record (242) the acknowledgement(s) in memory or similar component. Accordingly, the computing system 210 may subsequently access the acknowledgment(s) and any data relating thereto, such as in determining a subsequent operation modification for the autonomous vehicle 208, the emergency vehicle 209, and/or any additional autonomous vehicle.

Figure 3:
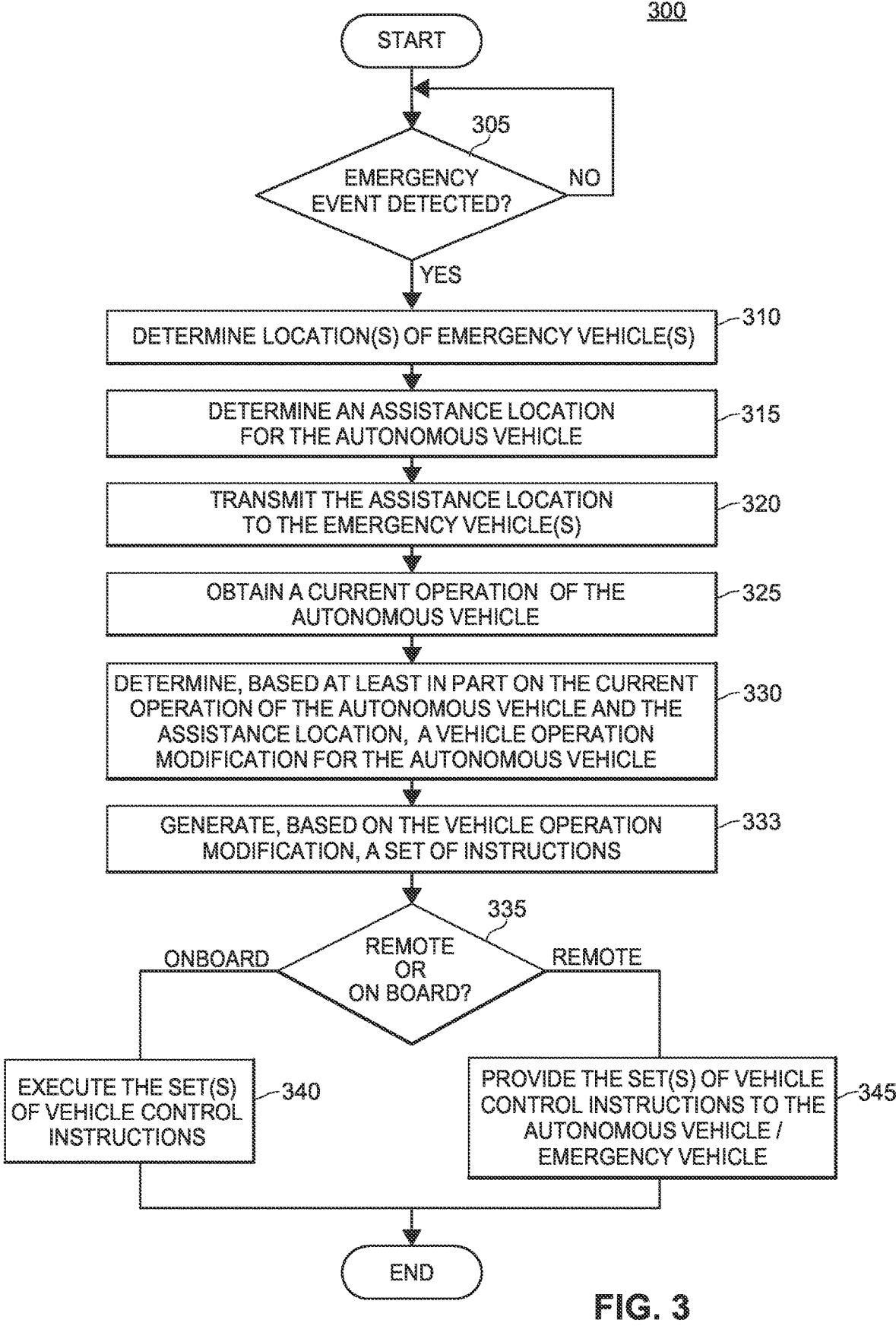
FIG. 3 depicts an example flow diagram associated with facilitating operation of an autonomous vehicle(s), in accordance with some embodiments.

FIG. 3 depicts is a block diagram of an example method 300 of facilitating operation of an autonomous vehicle. The method 300 may be facilitated by a computing device that may be associated with an autonomous vehicle, where the computing device may be remote from or onboard the autonomous vehicle, and where the autonomous vehicle may be a non-emergency vehicle. It should be appreciated that the method 300 may also be performed by an emergency autonomous vehicle. Additionally, the computing device may be configured to communicate with one or more electronic devices or components.

The method 300 may begin when the computing device determines (block 305) whether an emergency event is detected, where the emergency event is associated with an autonomous vehicle. In embodiments, the computing device may locally detect the emergency event or may be notified of the emergency event from a third-party source or component. If an emergency event is not detected ("NO"), processing may repeat, end, or proceed to other functionality.

If an emergency event is detected ("YES"), the computing device may determine (block 310) one or more locations of one or more emergency vehicles. The determination of the one or more emergency vehicles may include determining which emergency vehicles are nearest to the autonomous vehicle or nearest to the assistance location that the autonomous vehicle is expected to be relocated to.

At block 315, the computing device may determine an assistance location for the autonomous vehicle. As described herein, the assistance location may be a future location for the autonomous vehicle to receive assistance from the one or more emergency vehicles. In some embodiments, the assistance location is a roadside location. In other embodiments, the assistance location is at or near a treatment center or police station.

At block 320, the computing device may transit the determined assistance location to the emergency vehicle(s).

For example, in some embodiments, and without limitation, the assistance location may be sent to one or more emergency vehicle(s) that indicated that they are available to handle the emergency event. In further embodiments, the determination of the one or more emergency vehicles may include determining specific emergency vehicles that are at least partially equipped to hand the emergency event (e.g., an ambulance for a medical based emergency event).

At block 325, the computing device may obtain a current operation of the autonomous vehicle. In some embodiments, the current operation data may be obtained when the event is detected, so as to transmit the current operation data with information describing the detected emergency event to a remote computing device. In other embodiments, the current operation data may be obtained at a later point.

At block 330, the computing device may determine, based at least in part on the current operation of the autonomous vehicle and the assistance location, a vehicle operation modification of the autonomous vehicle. The vehicle operation modification may include a modification to cause the autonomous vehicle to travel to the assistance location. For example, the vehicle operation modification may update the current route, speed, and/or behavior of the autonomous vehicle to travel to the assistance location in a manner determined by the control instructions described herein.

At block 333, the computing device may generate, based the vehicle operation modification, a set of vehicle instructions for the autonomous vehicle. That is, the computing device may generate, based on the vehicle operation modification, a set of vehicle control instructions for the autonomous vehicle. In an optional implementation, the computing device may generate an additional set of vehicle control instructions for an emergency autonomous vehicle. As indicated herein, the computing device may be remote from or on board the autonomous vehicle which is resolved in block 335.

At block 335, if the computing device is on board the autonomous vehicle ("ONBOARD"), the computing device may execute (block 340) the set of vehicle control instructions to cause the autonomous vehicle to operate according to the vehicle operation modification. Conversely, if the computing device is remote from the autonomous vehicle ("REMOTE"), the computing device may provide (block 345) the set of vehicle control instructions to the autonomous vehicle such that the autonomous vehicle executes the set of vehicle control instructions to cause the autonomous vehicle to operate according to the vehicle operation modification. In the optional implementation in which the computing device generates the additional set of vehicle control instructions for the emergency autonomous vehicle, the emergency autonomous vehicle may execute the additional set of vehicle control instructions ("ONBOARD") or the computing device may provide the additional set of vehicle control instructions to the emergency autonomous vehicle such that the emergency autonomous vehicle executes the additional set of vehicle control instructions ("REMOTE").

Figure 4:
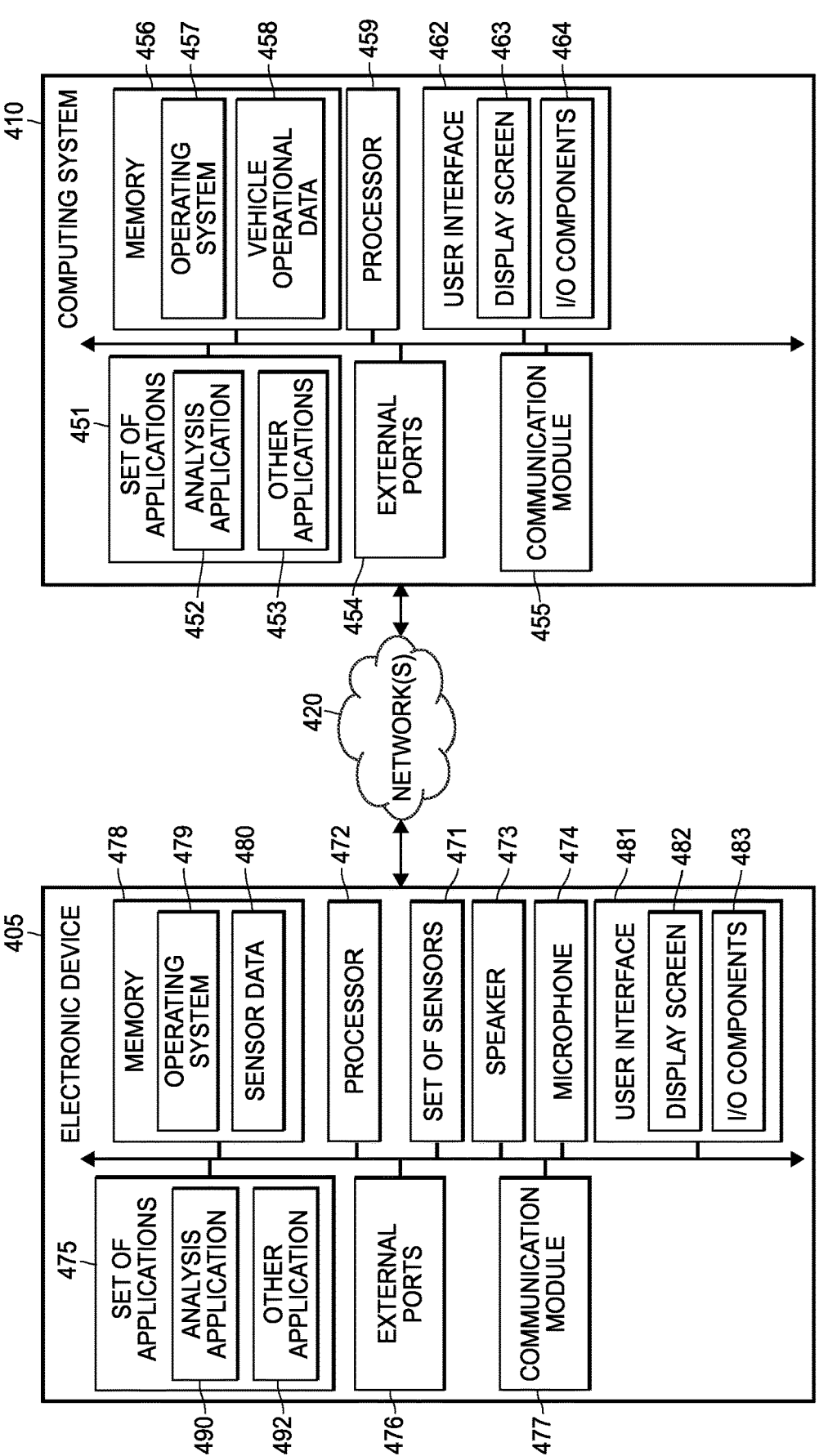
FIG. 4 is a hardware diagram of an example electronic device and an example computing system, in accordance with some embodiments.

FIG. 4 illustrates a hardware diagram of an example electronic device 405 (such as the computer 106 or the electronic device 111 as discussed with respect to FIG. 1) and an example computing system 410 (such as the remote computing system 110 as discussed with respect to FIG. 1), in which the functionalities as discussed herein may be implemented.

The electronic device 405 may include a processor 472 as well as a memory 478. The memory 478 may store an operating system 479 capable of facilitating the functionalities as discussed herein as well as a set of applications 475

(i.e., machine readable instructions). For example, one of the set of applications 475 may be an analysis application 490 configured to facilitate various of the functionalities as discussed herein. It should be appreciated that one or more other applications 492 are envisioned, such as an autonomous vehicle operation application.

The processor 472 may interface with the memory 478 to execute the operating system 479 and the set of applications 475. According to some embodiments, the memory 478 may also include sensor data 480 including data accessed or collected from a set of sensors. The memory 478 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others.

The electronic device 405 may further include a communication module 477 configured to communicate data via one or more networks 420. According to some embodiments, the communication module 477 may include one or more transceivers (e.g., WWAN, WLAN, and/or WPAN transceivers) functioning in accordance with IEEE standards, 3GPP standards, or other standards, and configured to receive and transmit data via one or more external ports 476. For example, the communication module 477 may interface with another device, component, or sensors via the network(s) 420 to retrieve sensor data.

The electronic device 405 may include a set of sensors 471 such as, for example, a location module (e.g., a GPS chip), an image sensor, an accelerometer, a clock, a gyroscope, a compass, a yaw rate sensor, a tilt sensor, telematics sensors, and/or other sensors. The electronic device 405 may further include a user interface 481 configured to present information to a user and/or receive inputs from the user. As shown in FIG. 4, the user interface 481 may include a display screen 482 and I/O components 483 (e.g., ports, capacitive or resistive touch sensitive input panels, keys, buttons, lights, LEDs). According to some embodiments, the user may access the electronic device 405 via the user interface 481 to review information, make selections, and/or perform other functions. Additionally, the electronic device 405 may include a speaker 473 configured to output audio data and a microphone 474 configured to detect audio.

In some embodiments, the electronic device 405 may perform the functionalities as discussed herein as part of a "cloud" network or may otherwise communicate with other hardware or software components within the cloud to send, retrieve, or otherwise analyze data.

As illustrated in FIG. 4, the electronic device 405 may communicate and interface with the computing system 410 via the network(s) 420. The computing system 410 may include a processor 459 as well as a memory 456. The memory 456 may store an operating system 457 capable of facilitating the functionalities as discussed herein as well as a set of applications 451 (i.e., machine readable instructions). For example, one of the set of applications 451 may be an analysis application 452 configured to facilitate various of the functionalities discussed herein. It should be appreciated that one or more other applications 453 are envisioned.

The processor 459 may interface with the memory 456 to execute the operating system 457 and the set of applications 451. According to some embodiments, the memory 456 may also include vehicle operation data 458, such as various operation regulations information, and/or other data. The memory 456 may include one or more forms of volatile and/or non-volatile, fixed and/or removable memory, such as read-only memory (ROM), electronic programmable read-only memory (EPROM), random access memory (RAM), erasable electronic programmable read-only memory (EE-PROM), and/or other hard drives, flash memory, MicroSD cards, and others.

The computing system 410 may further include a communication module 455 configured to communicate data via the one or more networks 420. According to some embodiments, the communication module 455 may include one or more transceivers (e.g., WWAN, WLAN, and/or WPAN transceivers) functioning in accordance with IEEE standards, 3GPP standards, or other standards, and configured to receive and transmit data via one or more external ports 454. For example, the communication module 455 may receive, from the electronic device 405, a set(s) of sensor data.

The computing system 410 may further include a user interface 462 configured to present information to a user and/or receive inputs from the user. As shown in FIG. 4, the user interface 462 may include a display screen 463 and I/O components 464 (e.g., ports, capacitive or resistive touch sensitive input panels, keys, buttons, lights, LEDs). According to some embodiments, the user may access the computing system 410 via the user interface 462 to review information, make changes, input training data, and/or perform other functions.

In some embodiments, the computing system 410 may perform the functionalities as discussed herein as part of a "cloud" network or may otherwise communicate with other hardware or software components within the cloud to send, retrieve, or otherwise analyze data.

In general, a computer program product in accordance with an embodiment may include a computer usable storage medium (e.g., standard random access memory (RAM), an optical disc, a universal serial bus (USB) drive, or the like) having computer-readable program code embodied therein, wherein the computer-readable program code may be adapted to be executed by the processors 472, 459 (e.g., working in connection with the respective operating systems 479, 457) to facilitate the functions as described herein. In this regard, the program code may be implemented in any desired language, and may be implemented as machine code, assembly code, byte code, interpretable source code or the like (e.g., via Golang, Python, Scala, C, C++, Java, Actionscript, Objective-C, Javascript, CSS, XML). In some embodiments, the computer program product may be part of a cloud network of resources.

Although the following text sets forth a detailed description of numerous different embodiments, it should be understood that the legal scope of the invention may be defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component.

Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that may be permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that may be temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it may be communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but also deployed across a number of machines. In some example embodiments, the processor or processors may be located in a single location (e.g., within a home environment, an office environment, or as a server farm), while in other embodiments the processors may be distributed across a number of locations.

The performance of certain of the operations may be distributed among the one or more processors, not only residing within a single machine, but also deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

As used herein, the terms "comprises," "comprising," "may include," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed is:

1. A computer-implemented method of modifying operation of an autonomous vehicle, the method comprising:
   detecting, based on one or more sensors associated with the autonomous vehicle, an emergency event including a situation requiring immediate action associated with the autonomous vehicle; and
   in response to detecting the emergency event:
   (a) determining, by one or more processors, an assistance location for the autonomous vehicle based on operation data of a plurality of emergency autonomous vehicles,
   (b) determining, by the one or more processors, a location of an emergency autonomous vehicle of the plurality of emergency autonomous vehicles that is nearest to the assistance location, wherein the emergency autonomous vehicle is at least partially equipped to handle the emergency event,
   (c) causing, by the one or more processors, the autonomous vehicle to travel to the assistance location, and
   (d) causing, by the one or more processors, the emergency autonomous vehicle to operate according to one or more sets of instructions.

2. The computer-implemented method of claim 1, wherein causing the autonomous vehicle to travel to the assistance location includes:
   generating, by the one or more processors, a set of vehicle control instructions based on the assistance location; and
   executing, by the one or more processors, the set of vehicle control instructions to cause the autonomous vehicle to travel to the assistance location.

3. The computer-implemented method of claim 1, wherein the one or more processors associated with the autonomous vehicle are included in a mobile device.

4. The computer-implemented method of claim 1, wherein the assistance location is at or near a treatment center or police station.

5. The computer-implemented method of claim 1, wherein the assistance location is a roadside location.

6. The computer-implemented method of claim 1, wherein the emergency event is a medical emergency associated with an occupant within the autonomous vehicle.

7. The computer-implemented method of claim 1, further comprising:

transmitting, by the one or more processors, the assistance location to the emergency autonomous vehicle.

8. The computer-implemented method of claim 7, further comprising:

receiving, from the emergency autonomous vehicle, an expected response time indicating an expected time of arrival of the emergency autonomous vehicle at the assistance location, and providing to the autonomous vehicle the expected time of arrival.

9. The computer-implemented method of claim 1, wherein the one or more sets of instructions are at least partially based on a vehicle operation modification for the autonomous vehicle.

10. The computer-implemented method of claim 1, further comprising:

receiving, on a periodic basis, an updated location of the emergency autonomous vehicle, and providing to the autonomous vehicle, on the periodic basis, the updated location.

11. A system for modifying operation of an autonomous vehicle, comprising:

a memory storing a set of computer-executable instructions; and one or more processors interfacing with the memory, the one or more processors associated with the autonomous vehicle and configured to execute the computer-executable instructions to cause the one or more processors to:

detect, based on one or more sensors associated with the autonomous vehicle, an emergency event including a situation requiring immediate action associated with the autonomous vehicle; and in response to detecting the emergency event, the one or more processors are configured to:

(a) determine an assistance location for the autonomous vehicle based on operation data of a plurality of emergency autonomous vehicles, (b) determine a location of an emergency autonomous vehicle of the plurality of emergency autonomous vehicles that is nearest to the assistance location, wherein the emergency autonomous vehicle is at least partially equipped to handle the emergency event, (c) cause the autonomous vehicle to travel to the assistance location, and (d) cause the emergency autonomous vehicle to operate according to one or more sets of instructions.

12. The system of claim 11, wherein, to cause the autonomous vehicle to travel to the assistance location, the one or more processors are configured to:

generate a set of vehicle control instructions based on the assistance location; and execute the set of vehicle control instructions to cause the autonomous vehicle to travel to the assistance location.

13. The system of claim 11, wherein the one or more processors associated with the autonomous vehicle are included in a mobile device.

14. The system of claim 11, wherein the assistance location is at or near a treatment center or police station.

15. The system of claim 11, wherein the assistance location is a roadside location.

16. The system of claim 11, wherein the emergency event is a medical emergency associated with an occupant within the autonomous vehicle.

17. The system of claim 11, wherein the computer-executable instructions further cause the one or more processors to:

transmit the assistance location to the emergency autonomous vehicle.

18. The system of claim 17, wherein the computer-executable instructions further cause the one or more processors to:

receive, from the emergency autonomous vehicle, an expected response time indicating an expected time of arrival of the emergency autonomous vehicle at the assistance location, and provide to the autonomous vehicle the expected time of arrival.

19. The system of claim 11, wherein the one or more sets of instructions are at least partially based on a vehicle operation modification for the autonomous vehicle.

20. The system of claim 11, wherein the computer-executable instructions further cause the one or more processors to:

receive, on a periodic basis, an updated location of the emergency autonomous vehicle, and provide to the autonomous vehicle, on the periodic basis, the updated location.

* * * * *